United States Patent [19]

Bilgrien et al.

[11] Patent Number: 5,283,308
[45] Date of Patent: Feb. 1, 1994

[54] NEUTRALIZATION OF POLYORGANOSILOXANES USING TRIORGANOSILANES AND CURABLE COMPOSITIONS CONTAINING SAID POLYORGANOSILOXANES

[75] Inventors: Carl J. Bilgrien; Carol A. Hoag, both of Midland, Mich.

[73] Assignee: Dow Corning Corporation, Midland, Mich.

[21] Appl. No.: 956,226

[22] Filed: Oct. 5, 1992

[51] Int. Cl.$^5$ ............................................. C08G 77/12
[52] U.S. Cl. .................................... 528/15; 525/478; 525/14; 525/37
[58] Field of Search .................... 528/15, 14, 37; 525/478

[56] References Cited

U.S. PATENT DOCUMENTS

| | | | |
|---|---|---|---|
| 3,937,684 | 2/1976 | Razzano | 260/46.5 G |
| 3,978,104 | 8/1976 | Razzano | 260/448.2 E |
| 4,272,624 | 6/1981 | Razzano | 528/37 |
| 4,341,888 | 7/1982 | Razzano | 528/14 |
| 4,719,276 | 1/1988 | Stebleton | 528/37 |
| 5,173,558 | 12/1992 | Hansen et al. | 524/14 |

*Primary Examiner*—Melvyn I. Marquis
*Attorney, Agent, or Firm*—Robert Spector

[57] ABSTRACT

Curable polyorganosiloxanes prepared using a base-catalyzed equilibration reaction involving at least one organosiloxane are treated with a composition that includes a triorganohalosilane to neutralize the catalyst. The silane can be used alone or in combination with other Lewis acids. Curable compositions containing polyorganosiloxanes prepared using the present method exhibit improved thermal stability relative to compositions containing polyorganosiloxanes prepared using prior art neutralizing agents.

5 Claims, No Drawings

NEUTRALIZATION OF POLYORGANOSILOXANES USING TRIORGANOSILANES AND CURABLE COMPOSITIONS CONTAINING SAID POLYORGANOSILOXANES

BACKGROUND OF THE INVENTION

1. Field of the Invention

This invention relates to the preparation of polyorganosiloxanes. More particularly, this invention relates to a method for neutralizing polyorganosiloxanes prepared by a base-catalyzed equilibration of at least one lower molecular weight organosiloxane. This invention also relates to curable organosiloxane compositions containing these polyorganosiloxanes.

2. Background Information

A conventional method for preparing organosiloxane homopolymers and copolymers is by polymerization of at least one lower molecular weight linear or cyclic organosiloxane in the presence of an alkaline catalyst such as an alkali metal hydroxide or silanolate. The resultant copolymer is then treated with a Lewis acid such as a mineral or carboxylic acid to neutralize the catalyst.

The present invention is based on the discovery that the reagent used to neutralize the polymerization catalyst has a substantial effect on the heat stability of gels and elastomers prepared from the resultant polymer.

The prior art describes a variety of Lewis acids suitable for use in neutralizing the catalyst following completion of a base catalyzed polymerization or equilibration of cyclic and/or linear polyorganosiloxanes. The use of halosilanes is taught in U.S. Pat. No. 3,937,684, which issued on Feb. 10, 1976; U.S. Pat. No. 3,978,104, which issued on Aug. 31, 1976; U.S. Pat. No. 4,272,624, which issued on Jun. 9, 1981; U.S. Pat. No. 4,341,888, which issued on Jul. 27, 1982. In all of these patents the halosilane can contain from 0 to 3 hydrocarbon radicals bonded to the silicon atom. The halosilane exemplified in all of these patents is dimethyldichlorosilane and the polyorganosiloxane is a dipolyorganosiloxane.

Gels and elastomers prepared by curing compositions containing a polyorganosiloxane, a silane or siloxane containing silicon-bonded hydrogen atoms or hydrolyzable groups such as alkoxy and a suitable curing catalyst are used as potting compounds, coatings and encapsulants in a variety of applications. Some of these applications require that the cured organosiloxane material maintain its initial properties, particularly hardness and flexibility, during exposure under adverse conditions of heat and/or moisture.

One objective of this invention is to improve the thermal stability of polyorganosiloxanes in general and alkenyl-containing organosiloxane copolymers in particular.

A second objective of this invention is to improve the long-term heat stability of gels prepared by the reaction of an alkenyl-substituted polyorganosiloxanes and an organohydrogensiloxane in the presence of a hydrosilation catalyst. The heat stability of organosiloxane gels can be determined by plotting the distance to which a given weight will depress the surface of the gel, also referred to as the penetration value of the gel, as a function of exposure time to a given temperature.

SUMMARY OF THE INVENTION

The present inventors discovered that the objectives of this invention can be achieved by treating a curable polyorganosiloxane prepared using a base-catalyzed equilibration reaction involving at least one organosiloxane with a composition that includes a triorganohalosilane. The silane can be used alone or in combination with other Lewis acids.

In particular, gels prepared by reacting an organohydrogensiloxane with an alkenyl-substituted organosiloxane copolymer that has been prepared using a alkali metal base catalyzed equilibration reaction and subsequently neutralized using a Lewis acid composition comprised at least in part of a triorganohalosilane are more resistant to hardening, with a resultant decrease in penetration value, during long term exposure to temperatures of 200° C. and above than gels prepared using the same copolymer that has been neutralized using a carboxylic acid as the sole Lewis acid or a combination of a carboxylic acid and a diorganodihalosilane.

The penetration value of cured organosiloxane gels suitable for potting and encapsulation of solid state electronic devices and circuits containing these devices is preferably from 5.5 to about 13 millimeters, measured using a probe weight of 19.5 grams.

DETAILED DESCRIPTION OF THE INVENTION

This invention provides an improvement in the method for preparing polyorganosiloxanes by equilibration of at least one organosiloxane in the presence of a basic alkali metal compound as the catalyst, the method comprising maintaining a reaction mixture comprising at least one organosiloxane and a basic alkali metal compound as the equilibration/polymerization catalyst, neutralizing said catalyst with at least an equivalent amount, relative to said alkali metal compound, of a Lewis acid when the desired degree of polymerization is achieved, removing any excess of said Lewis acid from the reaction mixture, and isolating said polyorganosiloxane.

The improvement that characterizes the present method comprises neutralizing the equilibration/polymerization catalyst with a Lewis acid composition comprised at least in part of a triorganohalosilane of the general formula $R^1_3SiX$, where each $R^1$ is individually selected from the group consisting of monovalent unsubstituted and substituted hydrocarbon radicals and X represents a halogen atom. The molar ratio of triorganohalosilane to said alkali metal compound is at least 0.8:1, respectively.

Preparation of the Polyorganosiloxane

It is known that mixtures of cyclic and/or linear organosiloxanes containing repeating units of the general formula $R^2_nSiO_{4-n/2}$ undergo equilibration and polymerization in the presence of acidic or basic catalysts to form more thermodynamically stable organosiloxane materials. The reaction mixture may also contain at least one disiloxane or other source of triorganosiloxy terminal units.

Methods and catalysts for equilibration/polymerization reactions are sufficiently well known that a detailed description is not required as part of this specification.

In the formula for the siloxane units $R^2$ represents a monovalent hydrocarbon radical and n is 1, 2, or 3

In preferred embodiments of the present method, the reaction mixture contains a mixture of linear and cyclic organosiloxanes wherein at least one contains an alkenyl radical. Most preferably the reaction mixture contains at least one triorganosiloxy-terminated dipolyorganosiloxane, at least one cyclic diorganosiloxane oligomer and the hydrolysis product of a mixture of mono-, di-, and triorganosilanes where the remaining valences of the silicon atoms are satisfied by chlorine.

The organic groups bonded to the silicon atoms of the polyorganosiloxanes and the hydrolysis product are monovalent hydrocarbon radicals, most preferably alkyl radicals. Reaction mixtures of this type are described in U.S. Pat. No. 4,374,967, which issued on Feb. 22, 1983 to Brown et al.

Two of the preferred types of basic catalysts for equilibrating mixtures of organosiloxanes are alkali metal hydroxides and silanolates. A reaction mixture containing at least one organosiloxane and one of these catalysts is maintained under ambient conditions or more preferably with heating until the desired equilibrated organosiloxane or mixture of organosiloxanes is obtained, at which time the catalyst is neutralized using a Lewis acid. Suitable Lewis acids include but are not limited to mineral and carboxylic acids and organohalosilanes. The resultant organosiloxane homopolymer or copolymer or a mixture of these (co)polymers is then isolated from the products of the neutralization reaction.

Neutralization of the Organosiloxane (Co)polymer

In accordance with the present method the product of the equilibration reaction is neutralized using a composition that includes but is not limited to a liquid triorganomonohalosilane of the formula $R^1_3SiX$, where each of the three substituents represented by $R^1$ is a monovalent unsubstituted or substituted hydrocarbon radical and X is a halogen atom. The substituents are preferably halogen atoms and the hydrocarbon radicals represented by $R^1$ can be identical or different. For example, when $R^1$ is unsubstituted or substituted alkyl it can contain from 1 to about 6 carbon atoms and includes but is not limited to methyl, chloromethyl, ethyl, hexyl and 3,3,3 - trifluoropropyl. Other embodiments of $R^1$ include alkenyl contaning from 2 to 6 carbon atoms, cycloalkyl such as cyclohexyl, aryl such as phenyl, aralkyl such as benzyl and alkaryl such as tolyl.

The halogen atoms represented by X can be chlorine, bromine or iodine.

Preferred embodiments of the triorganohalosilane are trimethylchlorosilane, dimethylphenylchlorosilane and diphenylmethylchlorosilane.

The triorganohalosilane can constitute the entire portion of the Lewis acid used to neutralize the basic equilibration catalyst. For some applications of curable organosiloxane compositions, particularly those in contact with solid state electronic components such as transistors and integrated circuits, it is desirable to reduce or minimize the concentration of chloride ion in the curable organosiloxane composition. In such instances it is preferable to use the present triorganohalosilane in combination with other Lewis acids that do not contain chlorine or other halogens. Halogen-free neutralizing agents include but are not limited to mineral acids such as sulfuric acid and phosphoric acid and carboxylic acids such as acetic and propionic acids.

To achieve a substantial improvement in heat stability of cured organosiloxane compositions containing polyorganosiloxanes prepared using the present method, the molar ratio of triorganohalosilane to alkali metal equilibration catalyst should be at least 1:2. If other Lewis acid neutralizing agent are used, the triorganohalosilane can be added together with or following addition of these additional neutralizing agents.

To minimize the concentration of halogen in the final cured product the molar ratio of the triorganohalosilane to the alkali metal equilibration catalyst preferably does not exceed about 1:1.

To maximize the thermal stability of these cured materials any excess triorganohalosilane and other Lewis acids should be removed from the final polymer. This can be achieved by evaporation of the Lewis acid under reduced pressure or by reaction of the Lewis acid with a Lewis base to form either a salt that is insoluble in the reaction mixture and is subsequently removed by filtration or a water-soluble product that is removed by extraction of the reaction mixture with water. The Lewis base is preferably insoluble in the reaction mixture, and is removed by filtration. A preferred base of this type is magnesium oxide.

Curable organosiloxane compositions containing at least one polyorganosiloxane prepared using the present method are useful for a variety of applications requiring the unique properties of silicone materials. The compositions are particularly useful as shaped articles that can be fabricated using known methods, and as coating, potting and encapsulating materials to protect substrates such as electronic components that are damaged by water and other materials present in the environment surrounding these substrates.

When the compositions are used as potting and encapsulating compositions to protect semiconductor devices, to prevent damage to the devices the hardness of the cured organosiloxane composition, measured using a penetrometer equipped with a combined rod and probe weight of 19.5 grams, should not be less than about 5.5 mm.

A preferred class of organosiloxane gel-forming compositions comprises at least one polyorganosiloxanes prepared using the present method and containing at least two vinyl or other alkenyl radical per molecule, an organohydrogensiloxane containing at least two silicon-bonded hydrogen atoms per molecule and a platinum-containing hydrosilation catalyst. Compositions of this type are described in the aforementioned U.S. Pat. No. 4,374,967 and U.S. Pat. No. 3,020,260, which issued to Nelson on Feb. 6, 1962.

Alternatively, the polyorganosiloxane prepared using the present method contains at least two silanol groups or silicon-bonded hydrolyzable groups per molecule and is incorporated into a moisture curable composition containing a curing agent that is a silane or other organosilicon compound with at least three hydrolyzable groups such as alkoxy per molecule. The composition may also contain a suitable catalyst to promote hydrolysis of the curing agent.

EXAMPLES

The following examples describe preferred embodiments of the present method and polyorganosiloxanes that can be purified using this method, and should therefore not be interpreted as limiting the scope of the invention as defined in the accompanying claims. Unless otherwise indicated all parts and percentages are by weight and viscosities were measured at 25° C.

EXAMPLE 1

This example demonstrates the improvement in thermal stability exhibited by organosiloxane gels prepared using an polyorganosiloxane treated in accordance with a preferred embodiment of the present method.

An organosiloxane copolymer consisting essentially of $Me_2SiO$, $Me_3SiO_{1/2}$, $Me_2ViSiO_{1/2}$ and $MeSiO_{3/2}$ units was prepared by equilibration of a reaction mixture containing 2.9 parts of symtetramethyldivinyldisiloxane, 13.7 parts of a trimethylsiloxy-terminated polydimethylsiloxane exhibiting a viscosity of 200 centistokes, 13.8 parts of a hydrolysis reaction product prepared from a mixture containing 71 percent dimethyldichlorosilane, 25 percent methyltrichlorosilane and 4 percent trimethylchlorosilane, 69.54 parts of cyclic dimethylsiloxane oligomers and 0.04 part of potassium hydroxide. A procedure for preparing a copolymer of this type is described in U.S. Pat. No. 4,374,967, which issued to Paul Brown, Chi-Long Lee and Myron T. Maxson on Feb. 22, 1983. This patent is hereby incorporated in its entirety by reference as a teaching of preferred organosiloxane copolymers that can be prepared using the present method.

0.0656 Part of propionic acid was then added to the reaction mixture, which represented about a 12 fold molar excess over the quantity of potassium hydroxide used to prepare the copolymer, followed by 0.022 part of dimethylphenylchlorosilane. The mixture was then heated a. 150° C. for about 1 hour to remove excess propionic acid, silane and other volatile materials. The resultant copolymer of this invention will be referred to hereinafter as copolymer A.

A curable organosiloxane composition was prepared by blending an amount of a liquid dimethylhydrogensiloxy-terminated polydimethylsiloxane sufficient to provide one silicon-bonded hydrogen atom for each vinyl radical present in 93.52 parts of copolymer A, 0.19 part of a 1 percent solution of N,N,N',N'-tetramethylethylenediamine in the same copolymer, and 0.19 part of a reaction product of hexachloroplatinic acid and symtetramethyldivinyldisiloxane that has been diluted with a liquid dimethylvinylsiloxy terminated polydimethylsiloxane in an amount sufficient to achieve a platinum content of 0.7 weight percent. The resultant mixture was allowed to age for 16-20 hours under ambient conditions, at which time it was blended with 93.52 parts of copolymer A. The composition was cured by heating it for 30 minutes at 150° C.

For comparative purposes a curable composition was prepared using the same types and amounts of ingredients, with the exception that copolymer A was replaced with an equal weight of copolymer B, C or D. These copolymers had been prepared using the same types and amounts of ingredients as copolymer A, with the exception that copolymer B had been neutralized only with propionic acid followed by removal of volatile materials under reduced pressure, copolymer C had been neutralized using a mixture containing 0.0656 weight percent propionic acid and 0.004 weight percent dimethyldichlorosilane, based on the weight of said copolymer, followed by removal of volatile materials, and copolymer D had been neutralized using a mixture containing 0.0656 weight percent propionic acid and 0.0164 weight percent trimethylacetoxysilane, based on the weight of said copolymer, followed by removal of volatile materials. The compositions were cured as described in the preceding section of this example.

The cured gels prepared using copolymers A-D were heated at 200° C. under ambient conditions for the time intervals indicated in Table 1. The penetration value of the gels was determined following each of the heating intervals using a Precision Penetrometer, Catalog No. 73510, manufactured by Precision Scientific Company. The instrument was equipped with a 4.5 gram probe attached to a 15 gram rod. The results represent an average of 5 samples.

TABLE 1

| Copolymer | Penetration Value (mm × 10⁻¹) Following X Hours At 200° C. | | | | |
|---|---|---|---|---|---|
| | X = 0 | 65.5 | 180.17 | 335.92 | 523.75 |
| A | 117.2 | 86.0 | 70.6 | 65.4 | 59.0 |
| B | 67.0 | 56.2 | 49.6 | 18.6 | 0 |
| C | 116.4 | 88.8 | 64.6 | 26.4 | 0 |
| D | 88.0 | 73.0 | 59.4 | 54.6 | 47.0 |

Only the cured gel prepared using the polyorganosiloxane neutralized with a silane of this invention, dimethylphenylchlorosilane, retained sufficient softness (expressed as a penetration reading of 5.9 mm) following over 500 hours at a temperature of 200° C.

EXAMPLE 2

This example demonstrates the method of this invention using diphenylmethylchlorosilane as the neutralizing agent and the ability to add this material either before or after removal of excess propionic acid used as the initial neutralizing agent.

An organosiloxane copolymer was prepared using the types and amounts of ingredients described in the preceding Example 1 and the procedure described in that example up to the neutralization step. One of the polymerization reaction mixtures was neutralized by combining it with 0.0656 parts of propionic acid and 0.022 parts of phenyldimethylchlorosilane, following which the unreacted propionic acid, silane and other volatile materials were removed by heating under reduced pressure as described in Example 1 to yield copolymer E, a copolymer of this invention.

A second copolymer (F) was prepared using the same procedure with the exception that following addition of the propionic acid the unreacted acid and other volatile materials were removed by heating under reduced pressure. 0.022 parts of phenyldimethylchlorosilane were then added and the reaction mixture was heated for two hours at 90° C. 2.0 parts of magnesium oxide were then added to react with the excess silane neutralization agent while the reaction mixture was heated for 2 hours at 70° C. The resultant magnesium chloride which precipitated together with unreacted magnesium oxide were removed by filtering the reaction mixture to isolate copolymer F.

Curable compositions were prepared as described in the preceding Example 1 using copolymers E and F. The following penetration values were obtained when the compositions were cured and evaluated for thermal stability as described in Example 1.

TABLE 2

| Copolymer | Penetration Value (mm $\times 10^{-1}$) Following X Hours at 200° C. | | | | |
|---|---|---|---|---|---|
| | X = 0 | 25 | 67 | 91 | 254 | 261 |
| E | 124 | 105 | — | 99 | 95 | — |
| F | 88 | — | 74 | — | — | 56 |

EXAMPLE 3

This example demonstrates the feasibility of using an amount of triorganohalosilane equivalent to 0.8 mole per mole of alkali metal hydroxide used as the polymerization catalyst, thereby reducing the chloride content of the final organosiloxane composition. The presence of chloride ions in a coating or encapsulant is detrimental to the operation of semiconductor devices used in electronic applications.

Two copolymers of this invention (G and H) were prepared using the types and amounts of ingredients described in the preceding Example 1 and the procedure described for copolymer F of example 2 up to the neutralization step, with the exception that water was added prior to addition of the magnesium oxide and 0.21 part of potassium hydroxide was used as the equilibration catalyst. 0.092 weight percent of water was used for copolymer G and 0.036 weight percent was used for copolymer H. One of the polymerization reaction mixtures was neutralized by combining it with 0.066 part of propionic acid and 0.153 part of diphenylmethylchlorosilane, equivalent to 2 moles of silane per mole of potassium hydroxide, and the second was neutralized with 0.061 part of diphenylmethylchlorosilane, equivalent to 0.8 moles of silane per mole of potassium hydroxide, following which the unreacted silane and other volatile materials were removed by both reaction mixtures by heating under reduced pressure as described in Example 1 to yield copolymer G and H, respectively.

The viscosities of both copolymers were measured and they were analyzed for volatiles, vinyl, hydroxyl content, sodium, potassium and chlorine. The results are reported in Table 3.

TABLE 3

| | Copolymer G | Copolymer H |
|---|---|---|
| Silane/KOH* | 2.0 | 0.8 |
| Wt % Vinyl | 0.240 | 0.238 |
| Wt % Volatiles | 2.9 | 3.2 |
| Viscosity (Pa · s) | 0.502 | 0.494 |
| Na (ppm) | <0.5 | <0.5 |
| K (ppm) | <0.5 | <0.5 |
| Wt % OH | 0.051 | 0.039 |
| Cl (ppb)** | 172 | <20 |

* = molar ratio
**ppb = parts per billion

Curable compositions were prepared as described in the preceding Example 1 using copolymers G and H. The following penetration values were obtained when the compositions were cured and evaluated for thermal stability as described in Example 1.

TABLE 2

| Copolymer | Penetration Value (mm) Following X Hours at 200° C. | | | | |
|---|---|---|---|---|---|
| | X = 0 | 21 | 115 | 159 | 206 |
| G | 116 | 95 | 76 | 72 | 66 |
| H | 104 | 93 | 76 | 72 | 65 |

These results demonstrate that when the present halosilanes are used in combination with a second Lewis acid such as a carboxylic acid to neutralize a Lewis base catalyzed equilibration of a polyorganosiloxane, less than a molar equivalent of the silane based on the moles of Lewis base can be used without adversely affecting the thermal stability of cured compositions prepared from compositions containing these polyorganosiloxanes.

That which is claimed is:

1. A curable organosiloxane composition exhibiting improved heat stability when cured, said composition comprising an polyorganosiloxane containing at least two alkenyl radicals per molecule, a quantity of organohydrogensiloxane sufficient to cure said composition and a hydrosilation catalyst in an amount sufficient to promote curing of said composition, where said polyorganosiloxane is prepared by (1) equilibrating a reaction mixture containing at least one organosiloxane and a basic alkali metal compound as the equilibration catalyst, (2) neutralizing said equilibration catalyst by reaction with stoichiometric excess of a Lewis acid composition containing a liquid triorganohalosilane of the general formula $R^1_3SiX$, where each $R^1$ is individually selected from the group consisting of monovalent unsubstituted and substituted hydrocarbon radicals and X is a halogen atom, (3) removing excess Lewis acid from said reaction mixture, and (4) isolating said polyorganosiloxane, where said trihalosilane is added at a molar ratio of said triorganohalosilane to said equilibration catalyst of at least 0.5 to 1.

2. A composition according to claim 1 where each of the three $R^1$ substituents is individually selected from the group consisting of alkyl and haloalkyl radicals containing from 1 to 4 carbon atoms and aryl radicals, X is chlorine, the triorganohalosilane constitutes at least 30 weight percent of said composition, said equilibration catalyst is an alkali metal hydroxide or silanolate, said excess Lewis acid is removed by evaporation from said reaction mixture under reduced pressure or by neutralization using an equivalent amount of a Lewis base, the organic groups bonded to the silicon atoms of the polyorganosiloxane are selected from the group consisting of monovalent unsubstituted and substituted hydrocarbon radicals.

3. A composition according to claim 2 where said alkali metal is potassium, the initial reaction mixture contains a mixture of mono-, di-, and triorganosiloxanes, said organic groups are selected from the group consisting of alkyl containing from 1 to 4 carbon atoms and phenyl, the equilibration of said reaction mixture is conducted by heating said mixture to a temperature of from 50° to 100° C., said Lewis acid composition includes at least one carboxylic acid in addition to said triorganosilane, and the molar ratio of triorganosilane to said catalyst does not exceed 1:1.

4. A curable composition according to claim 3 where the penetration value of the gel obtained by curing said composition is from 5.5 to 13 mm. under a total weight of 19.5 grams.

5. A composition according to claim 1 where said composition is packaged in at least two parts with said organohydrogensiloxane and said hydrosilation catalyst being located in separate parts.

* * * * *